Sept. 2, 1958 L. E. SMITH 2,850,073
VEHICLE SEATS
Filed July 1, 1954
Fig. 1
Fig. 2
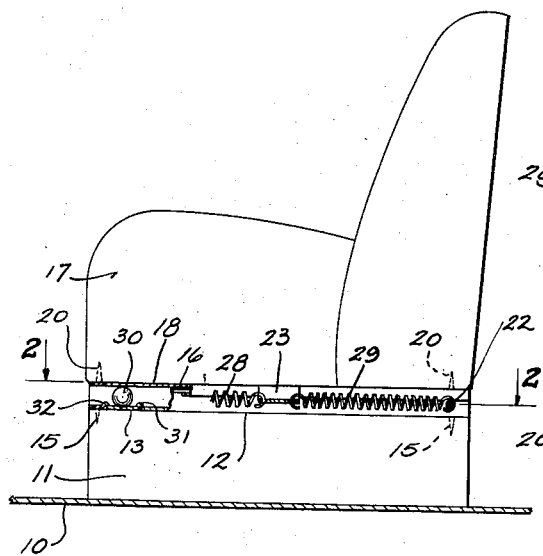
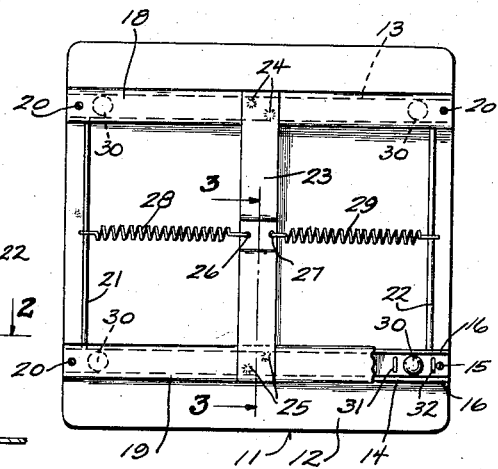
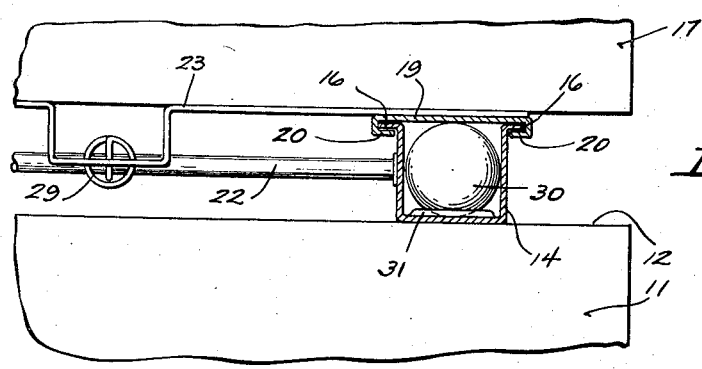
Fig. 3
INVENTOR.
LEROY E. SMITH
BY
Gerald P. Welch
ATTORNEY

United States Patent Office 2,850,073
Patented Sept. 2, 1958

2,850,073

VEHICLE SEATS

Leroy E. Smith, Milwaukee, Wis., assignor of one-half to Edward E. Kingsley, Milwaukee, Wis.

Application July 1, 1954, Serial No. 440,651

1 Claim. (Cl. 155—9)

This invention relates to improvements in vehicle seats, and more particularly to a novel vehicle seat having means for absorbing the shock of starting and stopping a vehicle.

An object of the invention is to provide a device of the type including antifrictional and spring means for imparting a yielding quality of the seat longitudinally of a vehicle.

Another object of the invention is to provide an economical device of the type simple in manufacture, efficient in operation and economical in cost and construction.

Other and further objects of the invention will appear as the description proceeds, reference being had to the acompanying drawing, in which:

Fig. 1 is a side view partly in elevation and partly in section of a vehicle seat embodying the invention.

Fig. 2 is a view taken on line 2—2 of Fig. 1.

Fig. 3 is a fragmentary vertical sectional view of one corner of the vehicle seat.

Referring more particularly to the drawing, the numeral 10 refers to the floor of a vehicle carrying the truck seat base 11, on the top surface 12 of which a pair of channel members 13 and 14 are secured by threaded means 15. The channels 13 and 14 have marginal outwardly disposed flanges 16. The seat 17 has subjoined thereto a pair of relatively flat channels 18 and 19. Each channel 18 and 19 has the inturned edges 20 which engage about the flanges 16 of the channels 13 and 14. The flat inverted channels 18 and 19 are held to the seat 17 by means of the screws 20. A pair of rods 21 and 22 are secured to and connect the channels 13 and 14. A spacer bar 23 is spot welded as at 24 to the inverted channel 18 and is also spot welded at 25 to the inverted channel 19. The cross bar 23 is apertured at 26 and 27 to accommodate the coil springs 28 and 29 which also engage the rods 21 and 22, respectively.

In the form of the invention shown, four ball bearings 30 are held one in each corner of the device between the upper channels 18 and 19 and the lower channels 13 and 14, and the said ball bearings 30 are trapped for limited movement between the ribs as at 31 and 32, a pair of which are disposed at each end of the lower channels 13 and 14.

In use, any movement of the vehicle 10 will result in a yielding movement in the springs 28 and 29 which will allow the seat 17 to move either forwardly or backwardly, depending upon whether the movement of the vehicle is forward or backward. It will thus be seen that the device will absorb the shock of starting and stopping.

It will be understood that the device is capable of many modifications in structure and design, within the scope of the appended claim, without departing from the spirit of the invention.

Having thus described the invention, what is claimed and desired to be secured by Letters Patent of the United States, is:

In combination with the horizontal top of a vehicle seat base, a pair of stand channel members secured to said base and having bottom and side webs, horizontal flanges projecting laterally from the tops of said side webs, a seat, a pair of strap elements on the bottom of said seat spaced in parallel relation, downwardly inturned arcuate flanges integral on said straps freely receiving the flanges of said stand channel members, an antifriction element adjacent to and within each end of each stand channel member projecting above the stand channel flanges to support the strap elements carrying the seat, a rod connecting each pair of ends of the stand channels, a bar fixed at right angles to central portions of and connecting said strap elements, a tension coil spring connecting each rod with said bar to limit the relative longitudinal movement of the seat straps over the stand channels and a plurality of pairs of transverse ribs struck up in the bottom web of the stand channel, the units of each pair of ribs spaced on opposite sides of each antifriction element to confine said anti-friction elements to a predetermined locus within said stand channels.

References Cited in the file of this patent

UNITED STATES PATENTS

| | | |
|---|---|---|
| 1,827,627 | Travis | Oct. 13, 1931 |
| 1,999,391 | Browne | Apr. 30, 1935 |
| 2,307,305 | Saunders et al. | Jan. 5, 1943 |
| 2,346,895 | Bergman | Apr. 18, 1944 |